Nov. 15, 1927.
H. A. UNKE
1,648,973
PIPE THREAD PROTECTOR
Filed Jan. 1, 1926
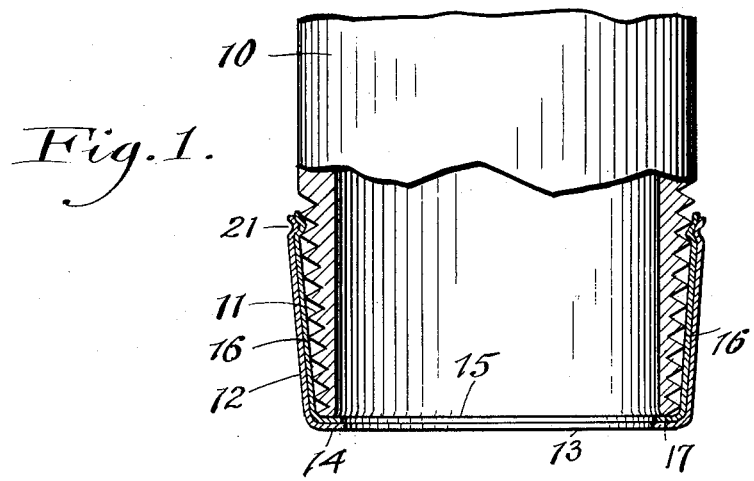
Fig. 1.
Fig. 2.
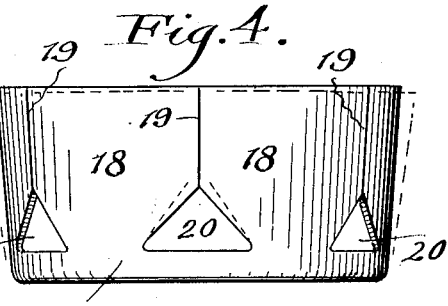
Fig. 4.
Fig. 3.
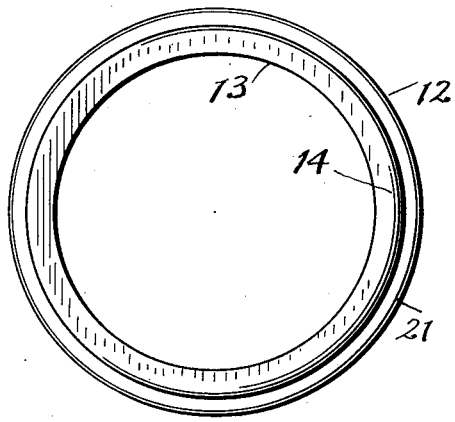
Fig. 5.
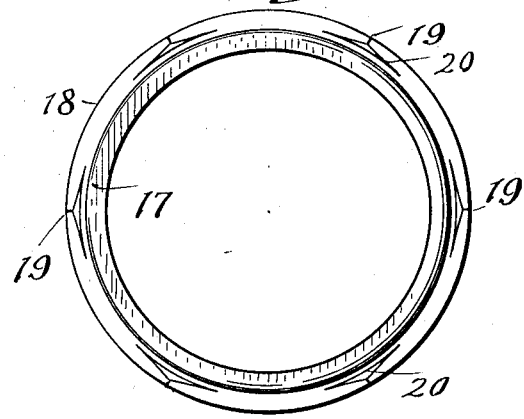
Inventor
Herman A. Unke
Kwis Hudson + Kent Attys.

Patented Nov. 15, 1927.

1,648,973

UNITED STATES PATENT OFFICE.

HERMAN A. UNKE, OF CLEVELAND, OHIO.

PIPE-THREAD PROTECTOR.

Application filed January 1, 1926. Serial No. 78,723.

This invention relates to devices for protecting the threads of pipes and other articles while being coated and also while being transported and handled and comprises certain improvements in the invention disclosed in my Patent No. 1,621,647, granted March 22, 1927.

It is one of the objects of the invention to provide a protector for the threaded surface of an article for the purpose of protecting the threads during the subsequent manufacturing operations to which the article is subjected. The invention is especially applicable to the manufacture of electrical conduit made from iron or steel pipe, to protect the threads from the coating material during the coating operation.

A further object of the invention is to provide a protector for threads that will be comparatively inexpensive to manufacture and which will be adapted for the purpose of protecting the threads while the article, such as a length of pipe, is being transported from the point of manufacture to the point of use. The invention has for a further object the provision of a form of construction that will insure against accidental removal of the protector, by the handling operations to which it is subjected in the course of its transportation, and does not require accuracy in its manufacture, so that the cost of production may be reduced to a minimum through the reduction of the wastage that is necessarily involved in the manufacture of an article to close limits of accuracy.

Other objects of the invention and the features of novelty will be apparent from the following description taken in connection with the accompanying drawings, of which:

Fig. 1 is a longitudinal section through the end of a pipe having my invention applied thereto;

Fig. 2 is a side elevation of the sheet-metal protector, with a portion shown in section;

Fig. 3 is a bottom plan of the protector as shown in Fig. 2;

Fig. 4 is a side elevation of the cup-shaped packing member that is employed with the sheet-metal protector; and Fig. 5 is a bottom plan view of the member shown in Fig. 4.

Referring to the drawings, 10 indicates a pipe having a tapered threaded end 11, according to the usual practice of making ordinary steam and water pipe and electrical conduits.

It is desirable to protect the threaded end 11, during transportation of the pipe and, in the case of manufacture of electrical conduit, it is desirable to have the threads protected from the coating material during the coating operation so that when the protector is removed, the threads will be clean and ready to receive any connection to be made therewith.

For these purposes, I have provided a sheet-metal protector 12 that is of cup shape and adapted to be manufactured from a flat blank by a single stamping operation. The central portion of the bottom wall of the member 12 is cut out to form the opening 13 and to leave the flange or end 14 that is arranged over the end 15 of the pipe. A cup-shaped packing member 16 is arranged between the protector 12 and the threads, and is preferably formed of a relatively soft but tough paper stock, of a fibrous nature. The member 16 may be manufactured from sheets by stamping operations and comprises an end wall 17, in the form of a ring, from which a plurality of wings 18 radiate, these wings being so formed that, when folded together, their longitudinal edges are in abutting relation as indicated at 19 and form a tight joint. In order to facilitate the bending of the wings 18 to form the cup-shaped member 16, I provide openings 20.

In applying the protector to the pipe, the member 16 is first placed over the threads and the wings 18 will have a tendency to spring away from the threads but will be forced back into engagement with the threads when the member 12 is driven over the member 16. On account of the taper of the threads 11 and the corresponding taper of the body of the member 12, the latter will readily slip over the member 16 for a certain distance. The member 12 is then driven on until the end wall 14 presses the end wall 17 into sealing engagement with the end 15 of the pipe. In order to tightly press the free ends of the wings 18 into the threads 11 to form a sealing engagement therewith, the member 12 is provided with an inwardly extending circumferential bead 21 which forms a corresponding bead in the wings 18, as shown in Fig. 1. In this way, all of the threads that are covered by the member 16 are thoroughly protected from the coating material and the bead 21 serves the additional purpose of firmly securing the protector on the threads so that there will be practically no liability for the protector to be accidentally removed. At the same time, the bead 21 avoids any necessity for having the taper of the member 12 accurately fit or conform to the taper of the threaded portion 11 and, in the manufacture of the member 12, relatively wide limits of accuracy may be tolerated.

Having thus described my invention, what I claim is:

1. In a device of the class described, the combination of an article having a threaded end, a member surrounding said threaded end and made of relatively soft material, and an annular sheet-metal protector surrounding said member, said protector having an inwardly extending circumferential bead adjacent one end for causing said member to be tightly wedged against said threads as and for the purposes described.

2. In a device of the class described, the combination of an article having a threaded end, a member surrounding said threaded end and made of relatively soft material, and an annular sheet-metal protector having a flaring body portion surrounding said member having one end open and a bottom wall at its other end which is adapted to press said member into sealing engagement with the end of said article, and said flaring body portion having a bead extending radially inward adjacent said open end thereof for causing said member to be tightly wedged against said threads.

3. In a device of the class described, the combination of an article having a portion to be protected and a shoulder adjacent to said portion, a cup-shaped member surrounding said portion with its bottom wall engaging said shoulder, said member being made of relatively soft material, and a cup-shaped sheet-metal protector surrounding said member, said protector having one end open, a bottom wall at its other end adapted to press the bottom wall of said member into sealing engagement with said shoulder, and a circumferential bead in said protector adjacent said open end adapted to press said member into sealing engagement with the outside of said portion as and for the purpose described.

4. In a device of the class described, the combination of an article having a tapered threaded end, a member made of relatively soft material and comprising a ring having integral therewith a plurality of wings cooperating with said ring to give to said member a cup shape adapted to substantially cover said threaded end, and a cup-shaped sheet-metal protector adapted to be driven over said member into wedging relation therewith, said protector having a circumferential bead in its side wall adapted to press said member into sealing engagement with said threads and a bottom wall adapted to press the bottom wall of said member into sealing engagement with the end of said article.

In testimony whereof, I hereunto affix my signature.

HERMAN A. UNKE.